(12) United States Patent
Barcelo

(10) Patent No.: US 12,399,514 B2
(45) Date of Patent: Aug. 26, 2025

(54) GAS APPARATUS

(71) Applicant: Peak Scientific Instruments Limited, Renfrew (GB)

(72) Inventor: Marcos Orellana Barcelo, Renfrew (GB)

(73) Assignee: PEAK SCIENTIFIC INSTRUMENTS LIMITED, Renfrew (GB)

( * ) Notice: Subject to any disclaimer, the term of this patent is extended or adjusted under 35 U.S.C. 154(b) by 0 days.

(21) Appl. No.: 18/223,947

(22) Filed: Jul. 19, 2023

(65) Prior Publication Data
US 2024/0028056 A1    Jan. 25, 2024

(51) Int. Cl.
| | |
|---|---|
| *G05D 7/06* | (2006.01) |
| *B01D 53/00* | (2006.01) |
| *B01D 53/047* | (2006.01) |
| *B01D 53/22* | (2006.01) |
| *B01D 53/26* | (2006.01) |

(Continued)

(52) U.S. Cl.
CPC ........... *G05D 7/0635* (2013.01); *B01D 53/00* (2013.01); *B01D 53/047* (2013.01); *B01D 53/22* (2013.01); *B01D 53/229* (2013.01); *F04B 39/16* (2013.01); *F04B 41/06* (2013.01); *F04B 49/06* (2013.01); *F04B 49/08* (2013.01); *F04B 49/22* (2013.01); *B01D 53/26* (2013.01); *B01D 2256/10* (2013.01); *B01D 2256/12* (2013.01);

(Continued)

(58) Field of Classification Search
CPC ................ G05D 7/0623; G05D 7/0635; Y10T 137/7761; B01D 53/047; B01D 53/22; B01D 53/229; B01D 53/00; B01D 53/26; B01D 2256/10; B01D 2256/12; B01D 2256/18; B01D 2256/22; B01D 2258/06; F04B 41/06; F04B 49/06; F04B 49/08; F04B 49/22
USPC ........................................ 137/487.5
See application file for complete search history.

(56) References Cited

U.S. PATENT DOCUMENTS

| | | | | |
|---|---|---|---|---|
| 3,766,713 | A | * 10/1973 | Leonard | F28F 27/00 96/115 |
| 3,856,486 | A | * 12/1974 | Chang | G05D 16/02 96/397 |

(Continued)

OTHER PUBLICATIONS

European Patent Office, Search Report (R. 61 EPC), Jan. 4, 2024, 9 pages.

*Primary Examiner* — William M McCalister
(74) *Attorney, Agent, or Firm* — Dorton & Willis LLP; Ryan Willis

(57) ABSTRACT

A gas intake unit, a compressor unit, a gas separator, a separated gas outlet, and a pressure control apparatus. The compressor unit draws gas through the gas intake unit and into the compressor unit. The gas separator separates the compressed gas from the compressor unit. The separated gas outlet receives the separated compressed gas from the gas separator. The pressure control apparatus controls the pressure in the gas generation apparatus between the compressor unit and the gas separator. The pressure control apparatus comprises a body portion having a fluid inlet and a fluid outlet, a pressure sensor module, a valve module, and a control module. The pressure sensor module measures the pressure of fluid in the body portion. The valve module controls the flow of fluid out of the fluid outlet. The control module receives an output signal from the pressure sensor module and operates the valve module.

17 Claims, 5 Drawing Sheets

(51) Int. Cl.
*F04B 39/16* (2006.01)
*F04B 41/06* (2006.01)
*F04B 49/06* (2006.01)
*F04B 49/08* (2006.01)
*F04B 49/22* (2006.01)

(52) U.S. Cl.
CPC ...... *B01D 2256/18* (2013.01); *B01D 2256/22* (2013.01); *B01D 2258/06* (2013.01)

(56) References Cited

U.S. PATENT DOCUMENTS

| | | | | |
|---|---|---|---|---|
| 4,392,877 | A | * | 7/1983 | Funk .................... B01D 3/4227 202/160 |
| 4,434,746 | A | * | 3/1984 | Stewart ............. G05D 23/1934 165/243 |
| 4,717,396 | A | * | 1/1988 | Stengle ............. B01D 53/0454 137/118.01 |
| 4,846,850 | A | * | 7/1989 | Webb ................ B01D 53/1412 202/160 |
| 5,131,929 | A | | 7/1992 | Brockmann et al. |
| 5,820,642 | A | * | 10/1998 | Nagai .................. B01D 53/265 55/309.1 |
| 5,876,485 | A | * | 3/1999 | Andreani ............ B01D 53/053 96/144 |
| 2005/0235826 | A1 | * | 10/2005 | Jensvold ............. B01D 53/228 95/52 |
| 2018/0106698 | A1 | | 4/2018 | Karg et al. |
| 2024/0028056 | A1 | * | 1/2024 | Barcelo ................ B01D 53/00 |

\* cited by examiner

GAS APPARATUS

CROSS-REFERENCE TO RELATED APPLICATIONS

This application claims priority under 35 U.S.C. § 119 to United Kingdom patent application 2210595.1, filed Jul. 20, 2022, the disclosure of which is incorporated herein by reference.

BACKGROUND OF THE INVENTION

The present invention relates to a gas generation apparatus, gas processing apparatus, a pressure control apparatus, and methods of operating the same.

Gas processing and generation apparatuses including air intake units, compressor units, air filter units, water drain systems and gas storage tanks are known. While such apparatuses are capable of processing and generating filtered atmospheric air, they are susceptible to problems with gas purity and malfunction.

The present inventors have appreciated the shortcomings in the above-described apparatus and systems.

BRIEF SUMMARY OF THE INVENTION

According to a first aspect of the present invention there is provided a pressure control apparatus comprising:
  a body portion having a fluid inlet and a fluid outlet;
  a pressure sensor module, the pressure sensor module being configured to measure the pressure of fluid in the body portion;
  a valve module, the valve module being operable to control the flow of fluid out of the fluid outlet of the body portion; and
  a control module, the control module being configured to receive an output signal from the pressure sensor module, and operate the valve module.

The pressure control apparatus may be a pressure relief apparatus. The pressure control apparatus may be a pressure relief valve apparatus.

The pressure control apparatus may be for a gas generation apparatus, or gas generator. The pressure control apparatus may be for a gas processing apparatus, or gas generator.

The pressure control apparatus may be automatically operable. The control module may be configured to operate automatically. The control module may be configured to operate in dependence on the output signal received from the pressure sensor module. The control module may be configured to operate automatically in dependence on the output signal received from the pressure sensor module.

The pressure control apparatus may be operable to control the fluid pressure in a gas generation apparatus. The pressure control apparatus may be operable to control the fluid pressure in a gas processing apparatus.

The fluid may be gas. The fluid may be water. The fluid may be a water/gas mixture. The fluid may be gas with water vapour. The gas may be gas generated by a gas generation apparatus. The gas may be atmospheric air. The gas may be compressed atmospheric air. The gas may be filtered gas. The gas may be compressed filtered gas. The gas may be compressed and filtered atmospheric air.

The pressure sensor module may be arranged to receive fluid from the fluid inlet. The pressure sensor module may be arranged to receive fluid from the fluid inlet and pass the fluid to the valve module. The valve module may control the flow of fluid through the fluid outlet. In this arrangement, in use, the pressure control apparatus is measuring and controlling back pressure. In use with a gas generation apparatus, or gas processing apparatus, the pressure control apparatus may be used to measure and control the back pressure between the compressor and the gas separator. In use with a gas generation apparatus, or gas processing apparatus, the pressure control apparatus may be used to measure and control the back pressure downstream of the compressor.

The body portion may allow fluid to flow between the fluid inlet and the fluid outlet thereof. In use, fluid may flow through the body portion between the fluid inlet and the fluid outlet.

The fluid outlet may a vent. The fluid outlet may be an atmospheric vent. The fluid outlet may allow the fluid to vent to atmosphere.

The body portion may be configured such that, in use, fluid may flow into the pressure sensor module.

The body portion may include a pressure sensor module fluid outlet. The pressure sensor module fluid outlet may be fluidly connected to the body portion. That is, in use, fluid in the body portion may flow into the pressure sensor module via the pressure sensor module fluid outlet.

The body portion may include a first portion and a second portion. The first portion may be associated with the pressure sensor module, and the second portion may be associated with the valve module. The fluid inlet of the body portion may be associated with the first portion of the body portion. The fluid outlet of the body portion may be associated with the second portion of the body portion. The first and second portions of the body portion may be fluidly connected.

The first portion of the body portion may include a pressure sensor module fluid outlet. The pressure sensor module fluid outlet may be fluidly connected to the first portion of the body portion. That is, in use, fluid in the first portion of the body portion may flow into the pressure sensor module via the pressure sensor module fluid outlet.

In this arrangement, in use, fluid may flow through the first and second portions of the body portion and may also flow into the pressure sensor module via the pressure sensor module fluid outlet.

The fluid inlet of the body portion may be located at a side portion of the body portion. The fluid outlet of the body portion may be located at a side portion of the body portion. The fluid inlet of the body portion may be located on a first side portion of the body portion, and the fluid outlet of the body portion may be located on a second opposite side portion of the body portion.

The fluid inlet and fluid outlet of the body portion may be horizontally arranged. The fluid inlet and fluid outlet of the body portion may be linearly arranged. The fluid inlet and fluid outlet of the body portion may be vertically arranged.

The fluid inlet and fluid outlet may include fittings. The fittings may be ⅛" BSPP (British Standard Pipe Parallel) fittings. However, it should be appreciated that other fittings may be used.

The body portion may include a longitudinal axis. The longitudinal axis may extend between side portions of the body portion. The body portion may include a lateral axis. The lateral axis may extend between a top side and a bottom side of the body portion.

The fluid path between the fluid inlet and the fluid outlet of the body portion may be arranged linearly. The fluid path between the fluid inlet and the fluid outlet of the body portion may be substantially parallel to the longitudinal axis of the body portion.

The pressure sensor module may be configured to measure the pressure of fluid in at least a portion of the body portion.

The pressure sensor module may be fluidly connected to the body portion. The pressure sensor module may be configured to receive fluid from the body portion.

The pressure sensor module may be a transducer. The pressure sensor may generate an output signal, the output signal being indicative of the measured pressure. The output signal may be an electrical signal.

The pressure sensor may be a pressure transducer. However, it should be appreciated that 25 other types of pressure sensors may be used.

The pressure sensor module may be operable to measure pressure in the range of between 0 Pa and $1.6 \times 10^6$ Pa.

The pressure sensor module may be configured to output a signal to the control module. The output signal to the control module may be indicative of the measured pressure. The output signal may be an electrical signal. The output signal may vary as a function of the measured pressure. The output signal may be proportional to the measured pressure. The output signal may be linearly proportional to the measured pressure.

The pressure sensor module may be configured to continuously output a signal to the control module. The pressure sensor module may be configured to periodically output a signal to the control module.

The pressure sensor module may be configured to output one or more signals to the control module.

The control module may be configured to control the operation of the pressure sensor module.

The valve module may be operable to reduce the pressure of the fluid in the body portion. The valve module may be configured to reduce the pressure of the fluid in the body portion in use.

The valve module may include a valve. The valve module may include a valve component. The valve module may include a valve member.

The valve may be operable to control the flow of fluid out of the fluid outlet.

The valve may be configured to open and close. The valve may be operable to open and close.

The valve may be configured to allow fluid to flow from the body portion through the valve module to the atmosphere. The valve may be configured to allow fluid to flow from the body portion through the valve of the valve module to the atmosphere. The valve may be a vent valve. The valve may be a pressure relief valve. The valve may be a proportional pressure relief valve. The valve may be located on an upper portion of the second portion of the body portion of the apparatus.

The amount that the valve is opened between a fully closed position and a fully open position may be controlled. The valve may be a proportional valve. The valve may be a proportional control valve. The valve may be operable to control the amount that the valve is open between a fully closed position and a fully open position.

The amount that the valve is opened may be proportional to the difference between the measured pressure and a predetermined pressure. The predetermined pressure may be a pressure set point of the pressure control apparatus.

The opening and/or closing of the valve may be proportional to the difference between the measured pressure and a predetermined pressure. The predetermined pressure may be a pressure set point of the pressure control apparatus.

The valve may be an electronically-controlled valve. The valve may be an electro-mechanical valve. The valve may be a solenoid valve.

The control module may be operable to actuate the valve. The control module may be operable control the flow rate of fluid through the valve.

The control module may be operable to open and close the valve. The control module may be operable to modulate the opening and closing of the valve.

The control module may use a variable pulse, or pulse width modulation (PWM) to operate the opening and closing of the valve.

The control module may be configured to control the operation of the valve module.

The control module may be configured to operate the valve module in dependence on the output signal received from the pressure sensor module.

The control module may be configured to send a valve control signal to the valve of the valve module. The control module may be configured to control the opening and closing of the valve. The control module may be configured to actuate the valve. The valve may be configured to control the flow of fluid out of the body portion.

The pressure sensor module may be configured to send the output signal to the control module once a predetermined pressure has been reached in the body portion of the apparatus. The predetermined pressure may be a maximum pressure.

The pressure sensor module may be configured to continuously send an output signal to the control module, the output signal being representative of the pressure in the body portion of the apparatus.

The control module may be configured to send a valve control signal to the valve of the valve module once a predetermined pressure has been reached in the body portion of the apparatus. The predetermined pressure may be a maximum pressure.

The control module may be operable to maintain a substantially constant pressure in the body portion of the apparatus. The control module may be configured to operate the valve module to maintain a substantially constant pressure in the body portion of the apparatus.

The control module may be located on the body portion of the pressure control apparatus. The control module may be attached, or attachable, to the body portion of the pressure control apparatus.

The control module may include a micro controller (MC). The MC may include a power supply module, an input/output (I/O) module, a processor module, and a programming module. The control module may include one or more programmable memory devices. The control module may include one or more memory storage devices. The control module may include one or more computing devices. The control module may be operable to run or more computer programs.

The control module may be operable from a 24 v/0.5 A DC power source. However, it should be appreciated that other operational power settings may be used.

The control module may be configured to receive one or more pressure signals from the pressure sensor module.

The control module may be configured to control the pressure sensor module.

The control module may be configured to selectively receive output signals from the pressure sensor module. The control module may be configured to continuously receive output signals from the pressure sensor module.

The pressure sensor module may be configured to output signals to the control module at one or more predetermined pressure values.

The control module may be operable to set the pressure at which the pressure sensor module outputs a signal to the control module. This may be a pressure set point. This may be a predetermined pressure set point. The predetermined pressure set point may be a pressure at which the valve module reduces the pressure in the body portion of the apparatus.

The control module may be operable to set one or more pressures at which the pressure sensor module outputs a signal to the control module. These may be pressure set points. These may be predetermined pressure set points. The predetermined pressure set point may be a pressure at which the valve module reduces the pressure in the body portion of the apparatus. The pressure control apparatus may only operate a one set pressure set point at a time.

The control module may be operable to operate the valve module when the pressure measured by the pressure sensor module reaches the predetermined pressure set point.

The amount that the valve is opened is proportional to the difference between the measured pressure and a predetermined pressure set point.

The opening and/or closing of the valve may be proportional to the difference between the measured pressure and a predetermined pressure set point.

The, or each, predetermined pressure set point may be manually set on the control module. The control module may include a manual pressure set point. The manual pressure set point may be a switch. The position of the switch may select the pressure set point. The control module may include two positions for selection of the manual pressure set point. The control module may include two or more positions for selection of the manual pressure set point.

The control module may include an apparatus status indication device. The apparatus status indication device may be configured to indicate a status, or an operating condition of the apparatus. The apparatus status indication device may be configured to output one or more visual signals and/or audible signals.

The apparatus status indication device may be configured to indicate a predetermined pressure set point that the apparatus is set to.

According to a second aspect of the present invention there is provided a gas generation apparatus comprising:
  a gas intake unit;
  a compressor unit, the compressor unit being operable to draw gas through the gas intake unit and into the compressor unit;
  a gas separator, the gas separator being configured to separate the compressed gas from the compressor unit;
  a separated gas outlet, the separated gas outlet being configured to receive separated compressed gas from the gas separator; and
  a pressure control apparatus, the pressure control apparatus being operable to control the pressure in the gas generation apparatus between the compressor unit and the gas separator, the pressure control apparatus comprising:
    a body portion having a fluid inlet and a fluid outlet;
    a pressure sensor module, the pressure sensor module being configured to measure the pressure of fluid in the body portion;
    a valve module, the valve module being operable to control the flow or fluid out of the fluid outlet of the body portion; and
    a control module, the control module being configured to receive an output signal from the pressure sensor module, and operate the valve module.

The gas intake unit may be an air intake unit.

The compressor unit may be operable to draw atmospheric air through the gas intake unit.

The gas may be atmospheric air.

The fluid inlet of the pressure control apparatus may be configured to receive compressed gas from the compressor unit.

The gas separator may be a filter unit. The gas separator may be an air filter unit. The gas separator may be an atmospheric air filter unit.

The gas separator may be configured to separate the compressed gas into one or more components. The gas separator of the gas generation apparatus may be configured to separate out substantially all but one of the gas components of the compressed gas. The gas separator of the gas generation apparatus may be configured to selectively separate out substantially all but one of the gas components of the compressed gas.

Where the compressed gas is compressed atmospheric air, the gas separator may be configured to filter, or separate, the compressed atmospheric air into at least one of its constituent gas components. That is, the gas separator of the gas generation apparatus may be configured to filter, or separate, out substantially all but one of the gas components of the atmospheric air. The gas separator of the gas generation apparatus may therefore be operable to selectively filter, or separate, out four out of the five main gases present in atmospheric air. The remaining gas present after passing the compressed atmospheric air through the gas separator of the gas generation apparatus may therefore be nitrogen, oxygen, argon or carbon dioxide.

The gas separator of the gas generation apparatus may be a membrane filter. The gas separator of the gas generation apparatus may be a molecular sieve filter. The gas separator of the gas generation apparatus may be a carbon molecular sieve filter. The gas separator of the gas generation apparatus may be a mol sieve filter. The gas separator of the gas generation apparatus may be a dryer membrane filter. The gas separator of the gas generation apparatus may be a hollow fibre membrane filter. The gas separator of the gas generation apparatus may be a molecular sieve. The gas separator of the gas generation apparatus may be a catalytic reactor. The gas separator of the gas generation apparatus may be a hydrocarbon molecular sieve. The gas separator may be a membrane. The gas separator may be a pressure swing adsorption (PSA) apparatus. The gas separator may be a vacuum pressure swing adsorption (VPSA) apparatus. The gas separator may be a catalytic reaction apparatus. The gas separator may be a thermal swing adsorption (TSA) apparatus. The gas separator may be an electrolysis apparatus. The gas separator may be a fractional distillation apparatus. The gas separator may be a chemical reaction apparatus.

The apparatus may further comprise a gas storage tank. The gas storage tank may be configured to receive and store the separated compressed gas from the gas separator.

The gas storage tank may be connectable to the separated gas outlet (output circuit).

The gas generation apparatus may comprise two or more compressor units. Each compressor unit may draw gas through the gas intake unit. Alternatively, the gas generation apparatus may include two or more gas intake units, and each compressor may operate with its own gas intake unit. In this arrangement, each compressor unit includes its own gas separator, and pressure control apparatus. Each gas separator may be configured to filter, or separate, a different gas component from the gas. Each gas separator may be configured to filter, or separate, the same gas component from the gas.

Where the gas is atmospheric air, each gas separator may be configured to filter, or separate, a different constituent gas component from the atmospheric air. Each gas separator may be configured to filter, or separate, the same constituent gas component from the atmospheric air.

The gas generation apparatus may include two or more compressor units, each compressor unit being configured to operate with a gas separator, and a pressure control apparatus.

Embodiments of the second aspect of the present invention may include one or more features of the first aspect of the present invention or its embodiments. Similarly, embodiments of the first aspect of the present invention may include one or more features of the second aspect of the present invention or its embodiments.

According to a third aspect of the present invention there is provided a gas generation apparatus comprising:
a gas intake unit;
a compressor unit, the compressor unit being operable to draw gas through the gas intake unit and into the compressor unit;
a filter unit, the filter unit being configured to filter the compressed gas from the compressor unit;
a gas separator, the gas separator being configured to separate the compressed gas from the filter unit;
a separated gas outlet, the separated gas outlet being configured to receive separated compressed gas from the gas separator; and a pressure control apparatus, the pressure control apparatus being operable to control the pressure in the gas generation apparatus between the compressor unit and the gas separator, the pressure control apparatus comprising:
a body portion having a fluid inlet and a fluid outlet;
a pressure sensor module, the pressure sensor module being configured to measure the pressure of fluid in the body portion;
a valve module, the valve module being operable to control the flow of fluid out of the fluid outlet of the body portion; and
a control module, the control module being configured to receive an output signal from the pressure sensor module, and operate the valve module.

The gas intake unit may be an air intake unit.

The compressor unit may be operable to draw atmospheric air through the gas intake unit.

The gas may be atmospheric air.

The fluid inlet of the pressure control apparatus may be configured to receive compressed gas from the compressor unit.

The fluid inlet of the pressure control apparatus may be configured to receive compressed gas from the filter unit.

The fluid inlet of the pressure control apparatus may be configured to receive compressed air from the second filter unit.

The filter unit may be a fluid filter unit. The filter unit may be a vapour filter unit. The filter unit may be a fluid and vapour filter unit. The filter unit may be a fluid, vapour and particulate filter unit. The filter unit may be configured to remove fluid, vapour or particulates from the compressed gas from the compressor unit. The filter unit may be configured to remove moisture, coarse particulates and fine particulates from the compressed gas from the compressor unit.

The filter unit may include two or more filter components. Each filter component may include a predetermined filter characteristic. The filter unit may include three filter components. Each filter component may include a predetermined filter characteristic. The filter unit may include a plurality of filter components. Each filter component may include a predetermined filter characteristic.

The filter unit may include a first filter component. The first filter component may be configured to filter fluid from the compressed gas. The first filter component may be configured to filter fluid, vapour and particulates from the compressed gas. The first filter component may be configured to filter fluid in the form of liquid and/or vapour from the compressed gas.

The filter unit may include a second filter component. The second filter component may be configured to filter coarse particulates from the compressed gas. The coarse particulates may be mist or vapour.

The filter unit may include a third filter component. The third filter component may be configured to filter fine particulates from the compressed gas. Fine particulates may be any material or substance larger than 0.1 Micron.

The gas separator may be an air filter unit. The gas separator may be a separator unit.

The gas separator may be configured to separate the gas into one or more components. The gas separator of the gas generation apparatus may be configured to separate out substantially all but one of the gas components of the compressed gas. The gas separator of the gas generation apparatus may be configured to selectively separate out substantially all but one of the gas components of the compressed gas.

Where the compressed gas is compressed atmospheric air, the gas separator may be configured to filter, or separate, the compressed atmospheric air from the filter unit into at least one of its constituent gas components. That is, the gas separator of the gas generation apparatus may be configured to filter, or separate, out substantially all but one of the gas components of the atmospheric air. The gas separator of the gas generation apparatus may therefore be operable to selectively filter, or separate, out four out of the five main gases present in atmospheric air. The remaining gas present after passing the compressed atmospheric air through the gas separator of the gas generation apparatus may therefore be nitrogen, oxygen, argon or carbon dioxide.

The gas separator of the gas generation apparatus may be a membrane filter. The gas separator of the gas generation apparatus may be a molecular sieve filter. The gas separator of the gas generation apparatus may be a carbon molecular sieve filter. The gas separator of the gas generation apparatus may be a mol sieve filter. The gas separator of the gas generation apparatus may be a dryer membrane filter. The gas separator of the gas generation apparatus may be a hollow fibre membrane filter. The gas separator of the gas generation apparatus may be a molecular sieve. The gas separator of the gas generation apparatus may be a catalytic reactor. The gas separator of the gas generation apparatus may be a hydrocarbon molecular sieve. The gas separator may be a membrane. The gas separator may be a pressure swing adsorption (PSA) apparatus. The gas separator may be a vacuum pressure swing adsorption (VPSA) apparatus. The gas separator may be a catalytic reaction apparatus. The gas separator may be a thermal swing adsorption (TSA) apparatus. The gas separator may be an electrolysis apparatus. The gas separator may be a fractional distillation apparatus. The gas separator may be a chemical reaction apparatus.

The apparatus may further comprise a gas storage tank. The gas storage tank may be configured to receive and store the separated compressed gas from the gas separator.

The gas storage tank may be connectable to the separated gas outlet (output circuit).

The gas generation apparatus may comprise two or more compressor units. Each compressor unit may draw gas through the gas intake unit. Alternatively, the gas generation apparatus may include two or more gas intake units, and each compressor may operate with its own gas intake unit. In this arrangement, each compressor unit includes its own filter unit, pressure control apparatus, and gas separator. Each gas separator may be configured to filter, or separate, a different gas component from the gas. Each gas separator may be configured to filter, or separate, the same gas component from the gas.

Where the compressed gas is compressed atmospheric air, each gas separator may be configured to filter a different constituent gas component from the atmospheric air. Each gas separator may be configured to filter the same constituent gas component from the atmospheric air.

The gas generation apparatus may include two or more compressor units, each compressor unit being configured to operate with a filter unit, a pressure control apparatus, and a gas separator.

Embodiments of the third aspect of the present invention may include one or more features of the first, or second aspects of the present invention or its embodiments. Similarly, embodiments of the first, or second aspects of the present invention may include one or more features of the third aspect of the present invention or its embodiments.

According to a fourth aspect of the present invention, there is provided a method of controlling fluid pressure in an apparatus comprising the steps of:
 providing a pressure control apparatus comprising:
  a body portion having a fluid inlet and a fluid outlet;
  a pressure sensor module, the pressure sensor module being configured to measure the pressure of fluid in the body portion;
  a valve module, the valve module being operable to control the flow of fluid out of the fluid outlet of the body portion; and
  a control module, the control module being configured to receive an output signal from the pressure sensor module, and operate the valve module,
 operating the pressure sensor module to measure the pressure of a fluid in the body portion of the apparatus and outputting a signal to the control module; and
 operating the valve module in dependence on the signal received by the control module.

The signal output by the pressure sensor module may be representative of the pressure of the fluid in the body portion.

The pressure sensor module may output the signal to the control module when the pressure reaches a predetermined value. The pressure sensor module may continuously output the signal to the control module.

The control module may be configured to operate the valve module in dependence on a predetermined signal received from the pressure sensor module. The control module may be configured to operate the valve module only when a predetermined pressure has been measured, or reached.

Embodiments of the fourth aspect of the present invention may include one or more features of the first, second or third aspects of the present invention or their embodiments. Similarly, embodiments of the first, second or third aspects of the present invention may include one or more features of the fourth aspect of the present invention or its embodiments.

According to a fifth aspect of the present invention there is provided a method of generating gas comprising the steps of:
 providing a gas generation apparatus comprising:
  a gas intake unit;
  a compressor unit, the compressor unit being operable to draw gas through the gas intake unit and into the compressor unit;
  a gas separator, the gas separator being configured to separate the compressed gas from the compressor unit;
  a separated gas outlet, the separated gas outlet being configured to receive the separated compressed gas from the gas separator; and
  a pressure control apparatus, the pressure control apparatus being operable to control the pressure in the gas generation apparatus between the compressor unit and the gas separator, the pressure control apparatus comprising:
   a body portion having a fluid inlet and a fluid outlet;
   a pressure sensor module, the pressure sensor module being configured to measure the pressure of fluid in the body portion;
   a valve module, the valve module being operable to control the flow of fluid out of the fluid outlet of the body portion; and
   a control module, the control module being configured to receive an output signal from the pressure sensor module, and operate the valve module;
 operating the compressor unit to draw gas through the gas intake unit into the compressor unit;
 separating the compressed gas from the compressor unit with the gas separator;
 providing the separated gas to the separated gas outlet; and
 operating the pressure control apparatus to control the pressure in the gas generation apparatus between the compressor unit and the gas separator.

The gas intake unit may be an air intake unit.

The compressor unit may be operable to draw atmospheric air through the gas intake unit.

The gas may be atmospheric air.

The fluid inlet of the pressure control apparatus may be configured to receive compressed gas from the compressor unit.

Embodiments of the fifth aspect of the present invention may include one or more features of the first, second, third or fourth aspects of the present invention or their embodiments. Similarly, embodiments of the first, second, third or fourth aspects of the present invention may include one or more features of the fifth aspect of the present invention or its embodiments.

According to a sixth aspect of the present invention there is provided a method of generating gas comprising the steps of:
 providing a gas generation apparatus comprising:
  a gas intake unit;
  a compressor unit, the compressor unit being operable to draw gas through the gas intake unit and into the compressor unit;
  a filter unit, the filter unit being configured to filter the compressed gas from the compressor unit;
  a gas separator, the gas separator being configured to separate the compressed gas from the filter unit;

a separated gas outlet, the separated gas outlet being configured to receive the separated compressed gas from the gas separator; and a pressure control apparatus, the pressure control apparatus being operable to control the pressure in the gas generation apparatus between the compressor unit and the gas separator, the pressure control apparatus comprising:

a body portion having a fluid inlet and a fluid outlet;

a pressure sensor module, the pressure sensor module being configured to measure the pressure of fluid in the body portion;

a valve module, the valve module being operable to control the flow of fluid out of the fluid outlet of the body portion; and a control module, the control module being configured to receive an output signal from the pressure sensor module, and operate the valve module;

operating the compressor unit to draw gas through the gas intake unit into the compressor unit;

filtering the compressed gas from the compressor unit with the filter unit;

separating the compressed gas from the filter unit with the gas separator;

providing the separated gas to the separated gas outlet; and operating the pressure control apparatus to control the pressure in the gas generation apparatus between the compressor unit and the gas separator.

The fluid inlet of the pressure control apparatus may be configured to receive compressed gas from the compressor unit.

The fluid inlet of the pressure control apparatus may be configured to receive compressed gas from the filter unit.

Embodiments of the sixth aspect of the present invention may include one or more features of the first, second, third, fourth or fifth aspects of the present invention or their embodiments. Similarly, embodiments of the first, second, third, fourth or fifth aspects of the present invention may include one or more features of the sixth aspect of the present invention or its embodiments.

According to a seventh aspect of the present invention there is provided a gas processing apparatus comprising:

a gas intake unit;

a compressor unit, the compressor unit being operable to draw gas through the gas intake unit and into the compressor unit;

a gas outlet, the gas outlet being configured to receive compressed gas from the compressor unit; and a pressure control apparatus, the pressure control apparatus being operable to control the pressure in the gas processing apparatus downstream of the compressor unit, the pressure control apparatus comprising:

a body portion having a fluid inlet and a fluid outlet;

a pressure sensor module, the pressure sensor module being configured to measure the pressure of fluid in the body portion;

a valve module, the valve module being operable to control the flow or fluid out of the fluid outlet of the body portion; and a control module, the control module being configured to receive an output signal from the pressure sensor module, and operate the valve module.

The gas intake unit may be an air intake unit.

The compressor unit may be operable to draw atmospheric air through the gas intake unit.

The gas may be atmospheric air.

The pressure control apparatus may be operable to control the pressure in the gas processing apparatus between the compressor unit and the gas outlet.

The fluid inlet of the pressure control apparatus may be configured to receive compressed gas from the compressor unit.

The gas processing apparatus may further comprise a gas separator. The gas separator may be configured to separate the compressed gas from the compressor unit.

The pressure control apparatus may be operable to control the pressure in the gas processing apparatus between the compressor unit and the gas separator.

The gas separator may be a filter unit. The gas separator may be an air filter unit. The gas separator may be an atmospheric air filter unit.

The gas separator may be configured to separate the compressed gas into one or more components. The gas separator of the gas processing apparatus may be configured to separate out substantially all but one of the gas components of the compressed gas. The gas separator of the gas processing apparatus may be configured to selectively separate out substantially all but one of the gas components of the compressed gas.

Where the compressed gas is compressed atmospheric air, the gas separator may be configured to filter, or separate, the compressed atmospheric air into at least one of its constituent gas components. That is, the gas separator of the gas processing apparatus may be configured to filter, or separate, out substantially all but one of the gas components of the atmospheric air. The gas separator of the gas processing apparatus may therefore be operable to selectively filter, or separate, out four out of the five main gases present in atmospheric air. The remaining gas present after passing the compressed atmospheric air through the gas separator of the gas processing apparatus may therefore be nitrogen, oxygen, argon or carbon dioxide.

The gas separator of the gas processing apparatus may be a membrane filter. The gas separator of the gas processing apparatus may be a molecular sieve filter. The gas separator of the gas processing apparatus may be a carbon molecular sieve filter. The gas separator of the gas processing apparatus may be a mol sieve filter. The gas separator of the gas processing apparatus may be a dryer membrane filter. The gas separator of the gas processing apparatus may be a hollow fibre membrane filter. The gas separator of the gas processing apparatus may be a molecular sieve. The separator of the gas processing apparatus may be a catalytic reactor. The gas separator of the gas processing apparatus may be a hydrocarbon molecular sieve. The gas separator may be a membrane. The gas separator may be a pressure swing adsorption (PSA) apparatus. The gas separator may be a vacuum pressure swing adsorption (VPSA) apparatus. The gas separator may be a catalytic reaction apparatus. The gas separator may be a thermal swing adsorption (TSA) apparatus. The gas separator may be an electrolysis apparatus. The gas separator may be a fractional distillation apparatus. The gas separator may be a chemical reaction apparatus.

The apparatus may further comprise a gas storage tank. The gas storage tank may be configured to receive and store the separated compressed gas from the gas separator. The gas storage tank may be configured to receive and store the separated compressed gas from the compressor unit.

The gas storage tank may be connectable to the gas outlet (output circuit).

When the gas processing apparatus includes a gas separator, the gas outlet may be a separated gas outlet. The gas storage tank may be connectable to the separated gas outlet (output circuit).

The gas processing apparatus may comprise two or more compressor units. Each compressor unit may draw gas through the gas intake unit. Alternatively, the gas processing apparatus may include two or more gas intake units, and each compressor may operate with its own gas intake unit. In this arrangement, each compressor unit includes its own pressure control apparatus. Where the gas processing apparatus includes a gas separator, each compressor unit may include its own gas separator and pressure control apparatus. Each gas separator may be configured to filter, or separate, a different gas component from the gas. Each gas separator may be configured to filter, or separate, the same gas component from the gas.

Where the gas is atmospheric air, each gas separator may be configured to filter, or separate, a different constituent gas component from the atmospheric air. Each gas separator may be configured to filter, or separate, the same constituent gas component from the atmospheric air.

The gas processing apparatus may include two or more compressor units, each compressor unit being configured to operate with a pressure control apparatus. The gas processing apparatus may include two or more compressor units, each compressor unit being configured to operate with a gas separator, and a pressure control apparatus.

The gas processing apparatus may be a gas generation apparatus.

Embodiments of the seventh aspect of the present invention may include one or more features of the first, second, third, fourth, fifth, or sixth aspects of the present invention or their embodiments. Similarly, embodiments of the first, second, third, fourth, fifth, or sixth aspects of the present invention may include one or more features of the seventh aspect of the present invention or its embodiments.

According to an eighth aspect of the present invention there is provided a gas processing apparatus comprising:
  a gas intake unit;
  a compressor unit, the compressor unit being operable to draw gas through the gas intake unit and into the compressor unit;
  a filter unit, the filter unit being configured to filter the compressed gas from the compressor unit;
  a gas outlet, the gas outlet being configured to receive compressed gas from the compressor unit; and
  a pressure control apparatus, the pressure control apparatus being operable to control the pressure in the gas processing apparatus downstream of the compressor unit, the pressure control apparatus comprising:
    a body portion having a fluid inlet and a fluid outlet;
    a pressure sensor module, the pressure sensor module being configured to measure the pressure of fluid in the body portion;
    a valve module, the valve module being operable to control the flow of fluid out of the fluid outlet of the body portion; and
    a control module, the control module being configured to receive an output signal from the pressure sensor module, and operate the valve module.

The gas intake unit may be an air intake unit.

The compressor unit may be operable to draw atmospheric air through the gas intake unit.

The gas may be atmospheric air.

The pressure control apparatus may be operable to control the pressure in the gas processing apparatus between the compressor unit and the gas outlet.

The fluid inlet of the pressure control apparatus may be configured to receive compressed gas from the compressor unit.

The fluid inlet of the pressure control apparatus may be configured to receive compressed gas from the filter unit.

The filter unit may be a fluid filter unit. The filter unit may be a vapour filter unit. The filter unit may be a fluid and vapour filter unit. The filter unit may be a fluid, vapour and particulate filter unit. The filter unit may be configured to remove fluid, vapour or particulates from the compressed gas from the compressor unit. The filter unit may be configured to remove moisture, coarse particulates and fine particulates from the compressed gas from the compressor unit.

The filter unit may include two or more filter components. Each filter component may include a predetermined filter characteristic. The filter unit may include three filter components. Each filter component may include a predetermined filter characteristic. The filter unit may include a plurality of filter components. Each filter component may include a predetermined filter characteristic.

The filter unit may include a first filter component. The first filter component may be configured to filter fluid from the compressed gas. The first filter component may be configured to filter fluid, vapour and particulates from the compressed gas. The first filter component may be configured to filter fluid in the form of liquid and/or vapour from the compressed gas.

The filter unit may include a second filter component. The second filter component may be configured to filter coarse particulates from the compressed gas. The coarse particulates may be mist or vapour.

The filter unit may include a third filter component. The third filter component may be configured to filter fine particulates from the compressed gas. Fine particulates may be any material or substance larger than 0.1 Micron.

The gas processing apparatus may further comprise a gas separator. The gas separator may be configured to separate the compressed gas from the compressor unit. The gas separator may be configured to separate the compressed gas from the filter unit.

The pressure control apparatus may be operable to control the pressure in the gas processing apparatus between the compressor unit and the gas separator.

The gas separator may be an air filter unit. The gas separator may be a separator unit.

The gas separator may be configured to separate the gas into one or more components. The gas separator of the gas processing apparatus may be configured to separate out substantially all but one of the gas components of the compressed gas. The gas separator of the gas processing apparatus may be configured to selectively separate out substantially all but one of the gas components of the compressed gas.

Where the compressed gas is compressed atmospheric air, the gas separator may be configured to filter, or separate, the compressed gas from the filter unit into at least one of its constituent gas components. That is, the gas separator of the gas processing apparatus may be configured to filter, or separate, out substantially all but one of the gas components of the atmospheric air. The gas separator of the gas processing apparatus may therefore be operable to selectively filter, or separate, out four out of the five main gases present in atmospheric air. The remaining gas present after passing the compressed atmospheric air through the gas separator of the gas processing apparatus may therefore be nitrogen, oxygen, argon or carbon dioxide.

The gas separator of the gas processing apparatus may be a membrane filter. The gas separator of the gas processing apparatus may be a molecular sieve filter. The gas separator of the gas processing apparatus may be a carbon molecular sieve filter. The gas separator of the gas processing apparatus may be a mol sieve filter. The gas separator of the gas processing apparatus may be a dryer membrane filter. The gas separator of the gas processing apparatus may be a hollow fibre membrane filter. The gas separator of the gas processing apparatus may be a molecular sieve. The gas separator of the gas processing apparatus may be a catalytic reactor. The gas separator of the gas processing apparatus may be a hydrocarbon molecular sieve. The gas separator may be a membrane. The gas separator may be a pressure swing adsorption (PSA) apparatus. The gas separator may be a vacuum pressure swing adsorption (VPSA) apparatus. The gas separator may be a catalytic reaction apparatus. The gas separator may be a thermal swing adsorption (TSA) apparatus. The gas separator may be an electrolysis apparatus. The gas separator may be a fractional distillation apparatus. The gas separator may be a chemical reaction apparatus.

The apparatus may further comprise a gas storage tank. The gas storage tank may be configured to receive and store the separated compressed gas from the gas separator. The gas storage tank may be configured to receive and store the separated compressed gas from the compressor unit.

The gas storage tank may be connectable to the gas outlet (output circuit).

When the gas processing apparatus includes a gas separator, the gas outlet may be a separated gas outlet. The gas storage tank may be connectable to the separated gas outlet (output circuit).

The gas processing apparatus may comprise two or more compressor units. Each compressor unit may draw gas through the gas intake unit. Alternatively, the gas processing apparatus may include two or more gas intake units, and each compressor may operate with its own gas intake unit. In this arrangement, each compressor unit includes its own filter unit and pressure control apparatus. Where the gas processing apparatus includes a gas separator, each compressor unit may include its own filter unit, gas separator and pressure control apparatus. Each gas separator may be configured to filter, or separate, a different gas component from the gas. Each gas separator may be configured to filter, or separate, the same gas component from the gas.

Where the compressed gas is compressed atmospheric air, each gas separator may be configured to filter a different constituent gas component from the atmospheric air. Each gas separator may be configured to filter the same constituent gas component from the atmospheric air.

The gas processing apparatus may include two or more compressor units, each compressor unit being configured to operate with a filter unit and a pressure control apparatus. The gas processing apparatus may include two or more compressor units, each compressor unit being configured to operate with a filter unit, a pressure control apparatus, and a gas separator.

The gas processing apparatus may be a gas generation apparatus.

Embodiments of the eighth aspect of the present invention may include one or more features of the first, second, third, fourth, fifth, sixth, or seventh aspects of the present invention or their embodiments. Similarly, embodiments of the first, second, third, fourth, fifth, sixth, or seventh aspects of the present invention may include one or more features of the eighth aspect of the present invention or its embodiments.

According to a ninth aspect of the present invention there is provided a method of processing gas comprising the steps of:
providing a gas processing apparatus comprising:
a gas intake unit;
a compressor unit, the compressor unit being operable to draw gas through the gas intake unit and into the compressor unit;
a gas outlet, the gas outlet being configured to receive compressed gas from the compressor unit; and
a pressure control apparatus, the pressure control apparatus being operable to control the pressure in the gas processing apparatus downstream of the compressor unit, the pressure control apparatus comprising:
a body portion having a fluid inlet and a fluid outlet;
a pressure sensor module, the pressure sensor module being configured to measure the pressure of fluid in the body portion;
a valve module, the valve module being operable to control the flow or fluid out of the fluid outlet of the body portion; and
a control module, the control module being configured to receive an output signal from the pressure sensor module, and operate the valve module;
operating the compressor unit to draw gas through the gas intake unit into the compressor unit;
providing the gas to the gas outlet; and
operating the pressure control apparatus to control the pressure in the gas processing apparatus downstream of the compressor unit.

The gas intake unit may be an air intake unit.

The compressor unit may be operable to draw atmospheric air through the gas intake unit.

The gas may be atmospheric air.

The pressure control apparatus may be operable to control the pressure in the gas processing apparatus between the compressor unit and the gas outlet.

The fluid inlet of the pressure control apparatus may be configured to receive compressed gas from the compressor unit.

The gas processing apparatus may further comprise a gas separator. The gas separator may be configured to separate the compressed gas from the compressor unit.

The method may comprise the further step of separating the compressed gas from the compressor unit with the gas separator.

The pressure control apparatus may be operable to control the pressure in the gas processing apparatus between the compressor unit and the gas separator.

The gas processing apparatus may be a gas generation apparatus.

Embodiments of the ninth aspect of the present invention may include one or more features of the first, second, third, fourth, fifth, sixth, seventh, or eighth aspects of the present invention or their embodiments. Similarly, embodiments of the first, second, third, fourth, fifth, sixth, seventh, or eighth aspects of the present invention may include one or more features of the ninth aspect of the present invention or its embodiments.

According to a tenth aspect of the present invention there is provided a method of processing gas comprising the steps of:
providing a gas processing apparatus comprising:
a gas intake unit;

a compressor unit, the compressor unit being operable to draw gas through the gas intake unit and into the compressor unit;

a filter unit, the filter unit being configured to filter the compressed gas from the compressor unit;

a gas outlet, the gas outlet being configured to receive compressed gas from the compressor unit; and a pressure control apparatus, the pressure control apparatus being operable to control the pressure in the gas processing apparatus downstream of the compressor unit, the pressure control apparatus comprising:

a body portion having a fluid inlet and a fluid outlet;

a pressure sensor module, the pressure sensor module being configured to measure the pressure of fluid in the body portion;

a valve module, the valve module being operable to control the flow of fluid out of the fluid outlet of the body portion; and a control module, the control module being configured to receive an output signal from the pressure sensor module, and operate the valve module operating the compressor unit to draw gas through the gas intake unit into the compressor unit;

filtering the compressed gas from the compressor unit with the filter unit;

providing the gas to the gas outlet; and operating the pressure control apparatus to control the pressure in the gas processing apparatus downstream of the compressor unit.

The gas intake unit may be an air intake unit.

The compressor unit may be operable to draw atmospheric air through the gas intake unit.

The gas may be atmospheric air.

The pressure control apparatus may be operable to control the pressure in the gas processing apparatus between the compressor unit and the gas outlet.

The fluid inlet of the pressure control apparatus may be configured to receive compressed gas from the compressor unit.

The gas processing apparatus may further comprise a gas separator. The gas separator may be configured to separate the compressed gas from the compressor unit.

The method may comprise the further step of separating the compressed gas from the filter unit with the gas separator.

The pressure control apparatus may be operable to control the pressure in the gas processing apparatus between the compressor unit and the gas separator.

The gas processing apparatus may be a gas generation apparatus.

Embodiments of the tenth aspect of the present invention may include one or more features of the first, second, third, fourth, fifth, sixth, seventh, eighth, or ninth aspects of the present invention or their embodiments. Similarly, embodiments of the first, second, third, fourth, fifth, sixth, seventh, eighth, or ninth aspects of the present invention may include one or more features of the tenth aspect of the present invention or its embodiments.

BRIEF DESCRIPTION OF THE DRAWINGS

Embodiments of the invention will now be described, by way of example, with reference to the drawings, in which.

DETAILED DESCRIPTION OF THE INVENTION

Figure 1:
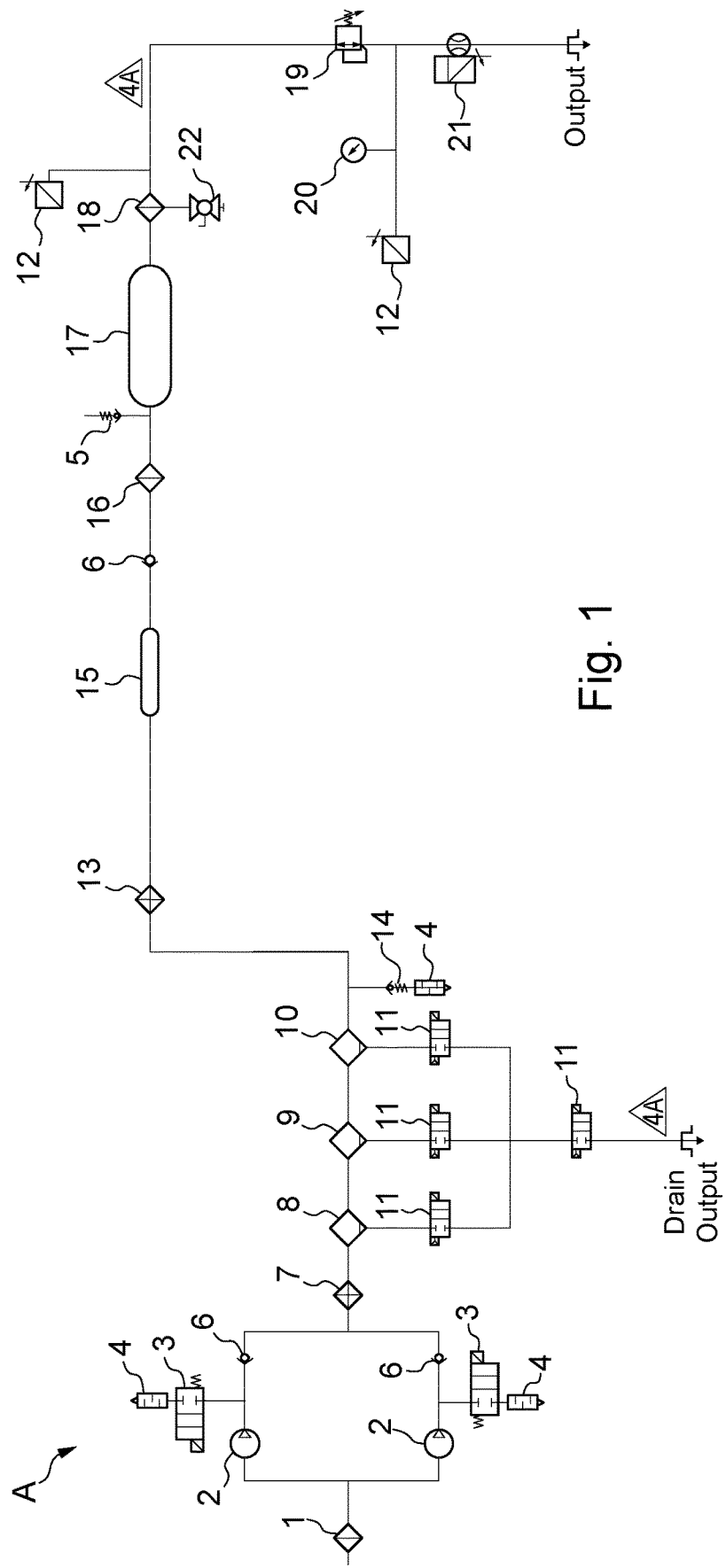
FIG. 1 is a schematic view of an example gas generation apparatus.
Figure 2A:
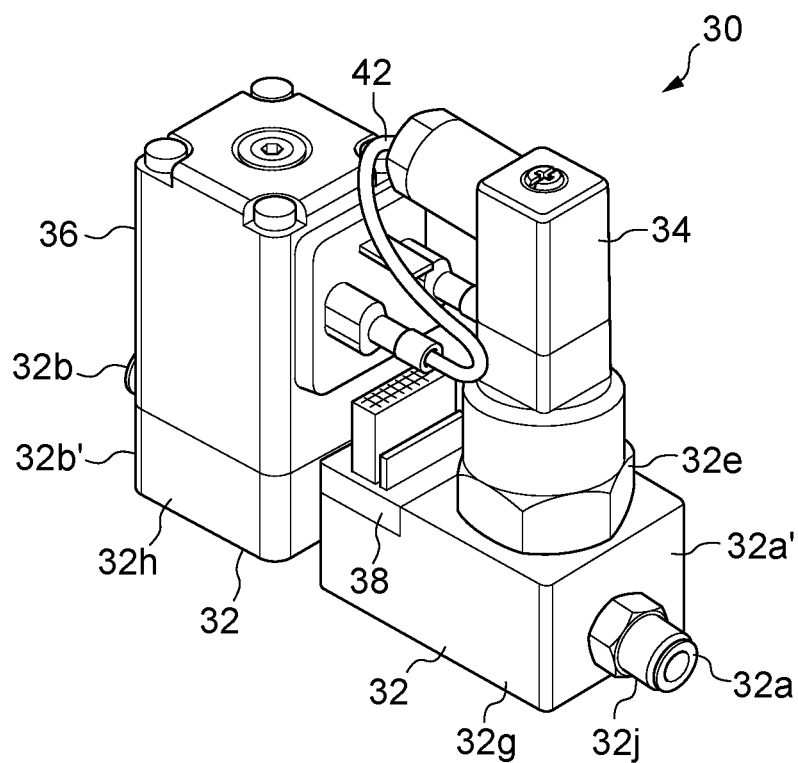
FIGS. 2a to 2f are perspective, side, top, bottom and end views of a pressure control apparatus in accordance with the present invention.
Figure 2B:
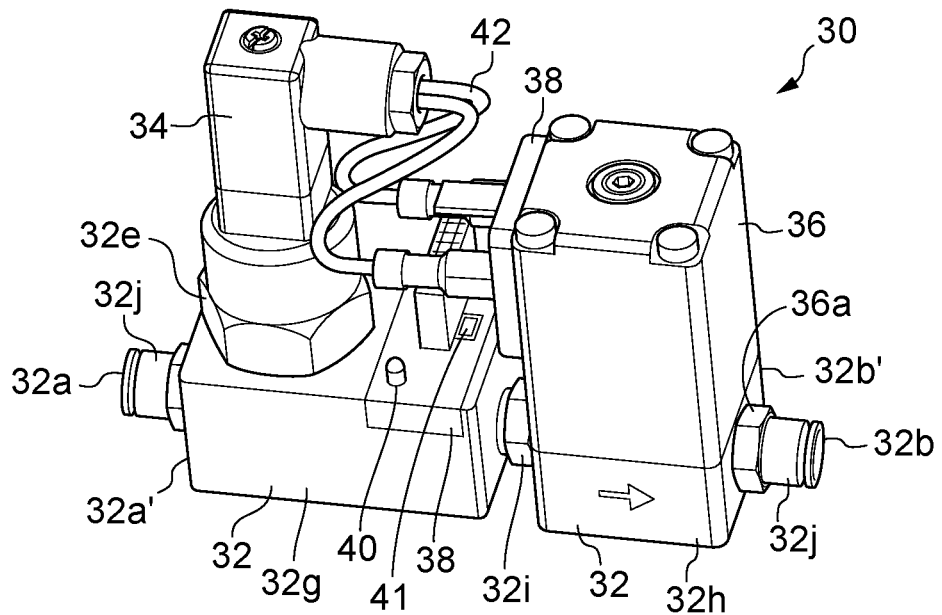
Figure 2C:
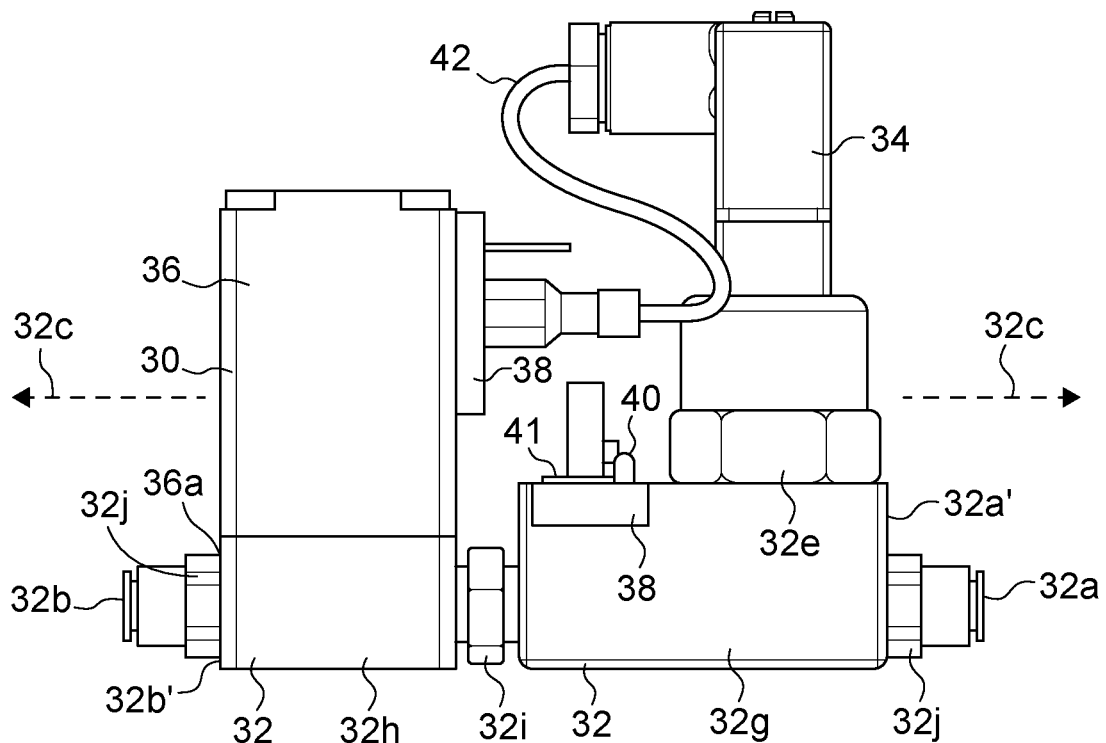
Figure 2D:
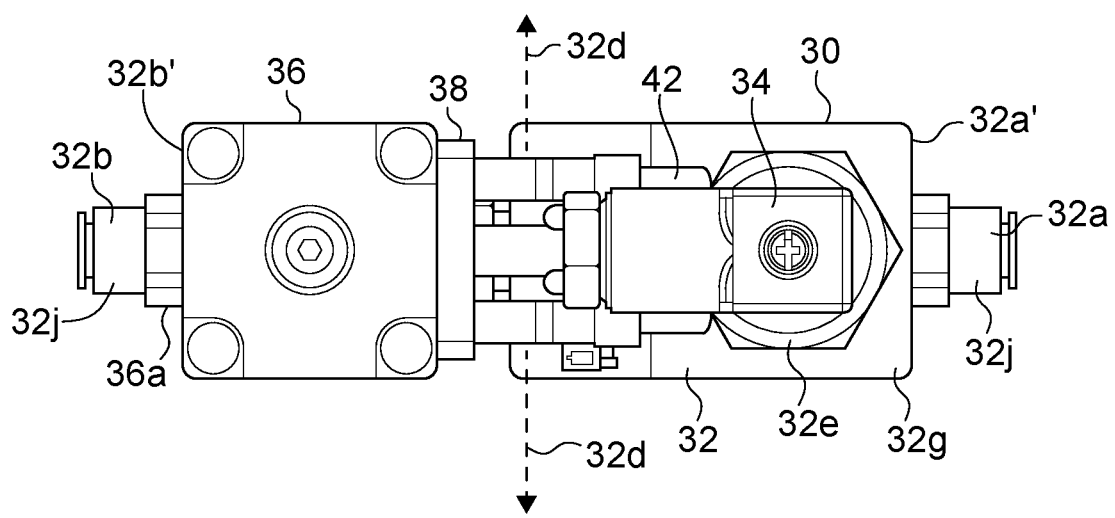
Figure 2E:
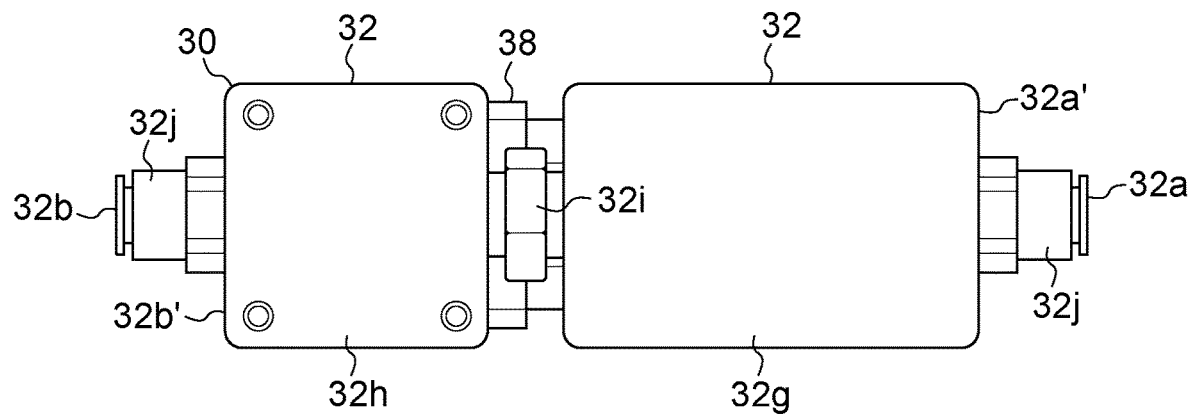
Figure 2F:
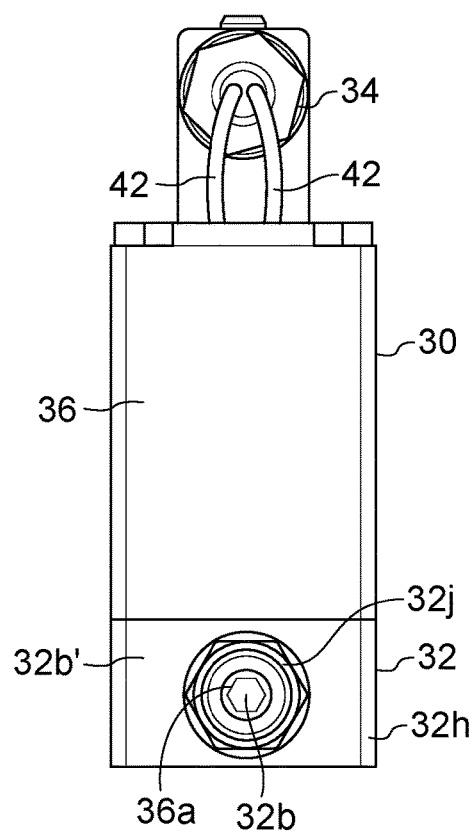

In the following description, numerous specific details are set forth to provide a thorough understanding of the present invention. However, it will be apparent to those skilled in the art that the present disclosure may be practiced without such specific details. It is to be understood that both the foregoing general summary description and the following detailed description are illustrative and explanatory, and are not restrictive of the subject matter, as claimed. It is to be further understood that the following disclosure also provides many different embodiments, or examples, for implementing different features of various illustrative embodiments. Specific examples of components and arrangements are described below to simplify the disclosure. These are, of course, merely examples and are not intended to be limiting. For example, a figure may illustrate an exemplary embodiment with multiple features or combinations of features that are not required in one or more other embodiments and thus a figure may disclose one or more embodiments that have fewer features or a different combination of features than the illustrated embodiment. Embodiments may include some but not all the features illustrated in a figure and some embodiments may combine features illustrated in one figure with features illustrated in another figure. Therefore, combinations of features disclosed in the following detailed description may not be necessary to practice the teachings in the broadest sense and are instead merely to describe particularly representative examples. In addition, the disclosure may repeat reference numerals and/or letters in the various examples. This repetition is for the purpose of simplicity and clarity and does not itself dictate a relationship between the various embodiments and/or configurations discussed.

In this application, the use of the singular includes the plural, the word "a" or "an" means "at least one", and the use of "or" means "and/or", unless specifically stated otherwise. Furthermore, the use of the term "including", as well as other forms, such as "includes" and "included", is not limiting. Also, terms such as "element" or "component" encompass both elements or components comprising one unit and elements or components that comprise more than one unit unless specifically stated otherwise. In addition, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, any use of terms such as "inboard," "outboard," "above," "below," "upper," "lower,"

or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

If so used herein, the terms "connect," "connection," "connected," "in connection with," and "connecting" may be used to mean in direct connection with or in connection with via one or more elements. Similarly, the terms "couple," "coupling," and "coupled" may be used to mean directly coupled or coupled via one or more elements. Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include such elements or features.

The term "substantially," "approximately," and "about" is defined as largely but not necessarily wholly what is specified (and includes what is specified; e.g., substantially 90 degrees includes 90 degrees and substantially parallel includes parallel), as understood by a person of ordinary skill in the art. The extent to which the description may vary will depend on how great a change can be instituted and still have a person of ordinary skill in the art recognized the modified feature as still having the required characteristics and capabilities of the unmodified feature. In general, but subject to the preceding, a numerical value herein that is modified by a word of approximation such as "substantially," "approximately," and "about" may vary from the stated value, for example, by 0.1, 0.5, 1, 2, 3, 4, 5, 10, or 15 percent.

The section headings used herein are for organizational purposes and are not to be construed as limiting the subject matter described. If any documents, or portions of documents, are cited in this application, including, but not limited to, patents, patent applications, articles, books, and treatises, such documents are hereby expressly incorporated herein by reference in their entirety for any purpose. In the event that one or more of such incorporated documents etc. and similar materials (if any) defines a term in a manner that contradicts the definition of that term in this application, this application controls.

FIG. 1 is a schematic example of a known gas generation apparatus. In the example illustrated here, the apparatus generates nitrogen gas from atmospheric air, and includes two compressor units. However, other gas generation apparatuses are known to generate other gases, or gas mixtures, and may include single compressors, or more than two compressors.

The operation of such gas generation apparatuses is well understood and no detailed explanation of the operation of the apparatuses will be provided here.

The gas generation apparatus A of FIG. 1 includes the following components:

1. Inlet filter
2. Compressor
3. Compressor offload valve
4. Silencer
5. Safety relief valve
6. Non-return valve
7. Fin tube cooler
8. Water separator
9. Coarse particulate filter
10. Fine particulate filter
11. Drain valve
12. Pressure transducer
13. Re-heat coil
14. Back pressure relief valve
15. Nitrogen membrane
16. Hydrocarbon tower filter
17. Nitrogen storage tank
18. Fine particulate filter
19. Output pressure regulator
20. Output pressure gauge
21. Flow transducer
22. Manual ball valve As is known with such gas generation apparatuses, the purity of the gas generated by the apparatus is dependent on the pressure, temperature and density of the compressed air that is separated. If the pressure of the compressed air supplied to the filter 15 (nitrogen membrane) drops, then the flow rate of the compressed air through the gas filter is reduced, which affects the purity of the generated gas.

Pressure and flow rate in known gas generation apparatuses may be affected by the operation of back pressure relief valves, such as back pressure relief valve 14 of the gas generation apparatus A of FIG. 1. Back pressure relief valve 14 controls the pressure of the compressed air between the compressors 2 and the nitrogen membrane (filter) 15. Such known pressure relief valves 14 are often mechanical valve components, with the operating relief pressure being set by manually adjusting the tension in a spring member that controls the opening and closing of the valve. However, manual adjustment of the pressure relief set point is difficult and prone to human error, which means that accurate pressure relief set points are hard to achieve. This leads to problems with the operation of the pressure relief valve, and the gas generation apparatus, as the valve does not open and close at the desired pressure setting.

Furthermore, due to the arrangement and materials of the mechanical components of the valve, other problems often occur with its operation. For example, it is common that the valve does not close properly after releasing pressure, which introduces a leak to the gas generation apparatus. This means that the compressors have to work harder and/or longer to ensure that a constant pressure of compressed atmospheric air is produced. This over-use of the compressors causes excess wear and tear and reduces their operational life span. Other issues also occur with an effective pressure differential being created between the pressure required to open the valve 14 and the pressure (force from spring) required to close the valve. That is, a pressure slightly higher than the pressure set point may be required to open the valve 14, and a pressure slightly lower than the pressure set point may be required to close the valve 14. This pressure differential results in a fluctuation of the pressure in the gas generation apparatus A, which affects the purity of the generated gas. Furthermore, again due to the arrangement and materials of the mechanical components of the valve 14, the performance characteristics of the valve are influenced by the environmental conditions in which the valve operates. The operational performance of the valve 14 is influenced by temperature, atmospheric pressure, humidity etc. Therefore, if the pressure set point of the valve 14 is set manually at a first location with a first set of environmental conditions, its performance often varies when it is operated at a second location with a second set of environmental conditions.

As stated above, the inventors of the present invention have appreciated the shortcomings with such known gas generation apparatus A.

With reference to FIGS. 2a to 2f, a pressure control apparatus 30 is illustrated. As described further below, the pressure control apparatus 30 may be used as part of a gas generation apparatus/gas processing apparatus A' of the present invention.

The pressure control apparatus 30 includes a body portion 32 having a fluid inlet 32a and a fluid outlet 32b, a pressure sensor module 34, a valve module 36 and a control module 38. The apparatus 30 is configured to operate within a gas generation apparatus/gas processing apparatus A' and control the fluid pressure between the compressors 12 and the nitrogen membrane 115 (an example of a gas separator), as described further below. It should also be appreciated that the pressure control apparatus 30 may be configured to control the gas pressure in a gas processing apparatus downstream of the compressor unit, as described further below. That is, it is not essential that the apparatus incudes filter units 18, 19, 110, or the nitrogen membrane 115, and the apparatus may process the atmospheric air from the compressors to produce compressed atmospheric air. Where the filter units 18, 19, 110 are used, the filtered compressed atmospheric air will have a reduced water/vapour content and a reduced density, as described further below. In this arrangement this is an example of a gas processing apparatus, in accordance with the present invention.

It will be appreciated that in the embodiment illustrated and described here that the term "fluid" includes gas, and compressed atmospheric gas, as is understood in relation to gas generation and gas generators. In the embodiment illustrated and described here, the gas generation apparatus/gas processing apparatus A' is described as using atmospheric air as the input gas. However, it should be appreciated that the gas generation apparatus A' may be used with other types of gases.

Figure 3:
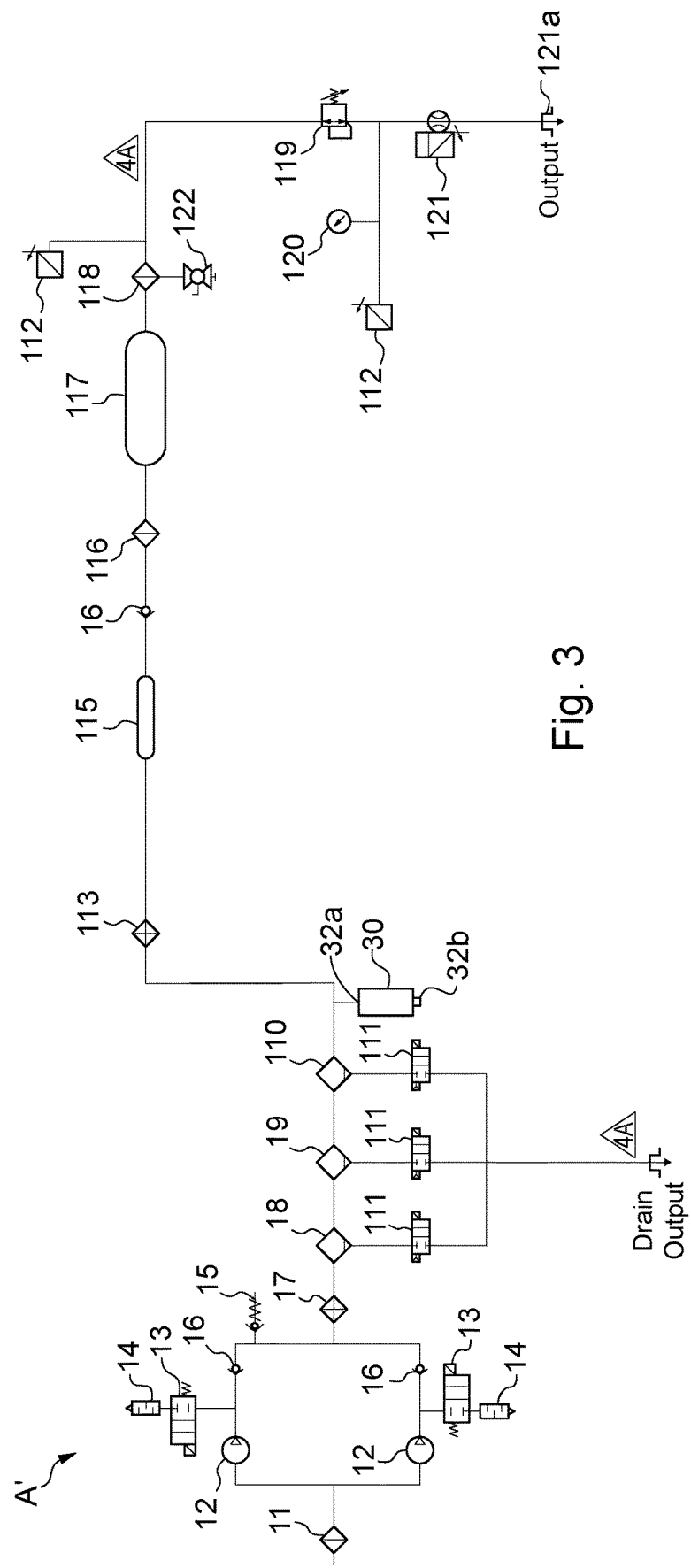
FIG. 3 is a schematic view of a gas generation apparatus/gas processing apparatus in accordance with the present invention.

As illustrated in FIG. 3, the pressure control apparatus 30 is positioned in the gas generation apparatus/gas processing apparatus A' to receive compressed and filtered atmospheric air from filter components 18, 19, 110 (an example of a filter unit). However, it should be appreciated that the location of the pressure control apparatus 30 may be different, and it may be located at any suitable point between the compressor units 12 and the nitrogen membrane 115, or simply downstream of the compressor units 12.

In the embodiment illustrated and described here, the fluid inlet 32a and fluid outlet 32b are arranged on side portions 32a' and 32b' of the body portion 32 in a substantially horizontal straight line, which is parallel to a longitudinal axis 32c of the body portion 32. In this arrangement the gas enters the body portion 32 through fluid inlet 32a and may be vented at fluid outlet 32b, as described further below. The body portion 32 also includes a lateral axis 32d. As described further below, in use, gas is also in fluidic communication with the pressure sensor module 34.

The body portion 32 includes a pressure sensor module fluid outlet 32e that allows gas to enter the pressure sensor module 34.

In the embodiment illustrated and described here, the body portion 32 includes a first portion 32g and a second portion 32h. The first portion 32g is associated with the pressure sensor module 34 and the second portion 32h is associated with the valve module 36. The first portion 32g incudes the pressure sensor module fluid outlet 32e. The first portion 32g and a second portion 32h are fluidly connected by a fitting 32i. However, it should be appreciated that the apparatus 30 may include a single body portion.

The fluid inlet 32a and fluid outlet 32b may include fittings 32j. The fittings 32j may be ⅛" BSPP (British Standard Pipe Parallel) fittings. However, it should be appreciated that other fittings may be used.

The pressure sensor module 34 is configured to measure the gas pressure in the body portion 32 of the apparatus 30. This pressure is the pressure of the compressed atmospheric gas generated by the compressors 12 and supplied to the nitrogen membrane 115. The pressure sensor module 34 measures the pressure of the gas flow through the gas generation apparatus/gas processing apparatus A'.

In the embodiment illustrated and describe here, the pressure sensor module 34 is a pressure transducer. However, it should be appreciated that other types of pressure sensors may be used.

As described further below, the pressure sensor module 34 is operable to measure the pressure of the gas in the body portion 32 and output a signal to the control module 38 that is representative of the pressure measurement. In the embodiment illustrated and described here, the output signal is an electrical signal. The electrical signal output by the pressure sensor module 34 is therefore proportional to the pressure of gas in the body portion 32.

In the embodiment illustrated and described here, the pressure sensor module 34 is operable to measure pressure in the range of between 0 Pa and $1.6 \times 10^6$ Pa. However, other operating pressure ranges are possible.

The pressure sensor module 34 may be configured to continuously output a signal to the control module 38, or periodically output a signal to the control module 38. The control module 38 may be configured to selectively receive output signals from the pressure sensor module 34, or continuously receive output signals from the pressure sensor module 34.

Furthermore, the pressure sensor module 34 may be configured to output one or more signals to the control module 38.

Signals from the pressure sensor module 34 may pass to the control module 38 via cables 42

The valve module 36 is operable to reduce the pressure of gas in the body portion 32 by controlling the flow of gas out of the fluid outlet 32b. As described further below, the valve module 36 does this by venting pressurised gas from the body portion 32 via a valve component 36a, and therefore from the gas generation apparatus A'.

In the embodiment illustrated and described here, the valve 36a is a solenoid valve (an example of an electronically-controlled valve), the actuation of which is controlled by the control module 38. As described further below, the valve 36a functions as a proportional relief valve. That is, the amount that the valve opens, or closes, and hence the pressure reduction in the body portion 32, may be controlled. Furthermore, the opening and/or closing, or actuation, of the valve 36a may be modulated by the control module 38. The valve 36a may be operable by pulse width modulation (PWM) control, or a variable pulse.

As described above, the control module 38 is configured to receive an output signal from the pressure sensor module 34, and operate the valve module 36. The control module 38 is configured to operate in dependence on the output signal received from the pressure sensor module 34. The pressure sensor module 34 may be operable to continuously send its output signal to the control module 38, or only send its output signal when the measured pressure reaches a predetermined set point. The predetermined set point may be a maximum allowable gas pressure in the gas generation apparatus/gas processing apparatus A'.

The control module 38 is configured to send a valve control signal to the valve 36a of the valve module 36 to control the opening and closing of the valve 36a.

The amount that the valve 36a is opened may be proportional to the difference between the measured pressure and a predetermined pressure. The predetermined pressure may be a pressure set point of the pressure control apparatus. The pressure set point of the control apparatus may be a maximum allowable gas pressure in the gas generation apparatus/gas processing apparatus A'.

As will be described further below, the control module 38 is configured to operate the valve module 36 in a manner that maintains a substantially constant pressure in the body of the apparatus 32.

In the embodiment illustrated and described here, the control module 38 is located on the body portion 32 of the pressure control apparatus 30. However, it should be appreciated that it may be attached, or attachable, to the body portion 32.

The control module 38 may include a micro controller (MC), a power supply module, an input/output (I/O) module, a processor module, and a programming module. The control module 38 may also include one or more programmable memory devices and one or more memory storage devices. The control module 38 may also include one or more computing devices and may be operable to run one or more computer programs. The control module 38 may also be operable from a 24 v/0.5 A DC power source. However, it should be appreciated that other operational power settings may be used.

The control module 38 is operable to set the pressure at which the pressure sensor module 34 outputs a signal to the control module 38. This may be a predetermined pressure set point. The predetermined pressure set point may be a pressure at which the valve module 36 reduces the pressure in the body portion 32 of the apparatus 30. Furthermore, the control module 38 may be operable to set one or more pressures at which point the pressure sensor module 34 outputs a signal to the control module 38. Therefore, the control module 38 may be operable to select one or more pressures at which the valve module 36 is operated to reduce the pressure in the body portion 32. Selection of the predetermined pressure set point may be manually selected by a switch 41 on the control module 38. It should be appreciated that two or more predetermined pressure set points may be set and selected by the control module 38. As described above, the, or each, predetermined pressure set point may be manually set on the control module 38.

Furthermore, the control module 38 also includes an apparatus status indication device 40. The apparatus status indication device 40 is configured to indicate a status, pressure set point, or an operating condition of the apparatus 30. The apparatus status indication device 40 is configured to output one or more visual signals and/or audible signals.

As will be described further below, the pressure control apparatus 30 is automatically operable to control the pressure in the gas generation apparatus/gas processing apparatus A'.

In use, the pressure control apparatus 30 is arranged to receive compressed atmospheric and filtered air from filter components 18, 19, 110 (an example of a filter unit), and supply the same to the nitrogen membrane 115, as illustrated in FIG. 3. Again, it should be appreciated that the location of the pressure control apparatus 30 may be different, and it may be located at any suitable point between the compressors 12 and the nitrogen membrane 115.

The pressure control apparatus 30 can be fully autonomous, or can be integrated with a control system of the gas generation apparatus/gas processing apparatus A'.

With reference to FIG. 3, the operation of a gas generation apparatus/gas processing apparatus A' of the present invention will now be described.

Prior to starting the compressors 12 to generate gas, the pressure control apparatus 30 is powered on and the control module 38 opens the valve 36a of the valve module to release any pressure upstream of the compressors 12 to atmosphere. This may be done for approximately 5 s to 20 s. Once this is complete, compressors 12 are powered on to flush any water out of the gas generation apparatus/gas processing apparatus A'. The valve 36a is then closed.

Compressed atmospheric air from the inlet filter 11 (an example of an air intake unit) is compressed by the compressors 12 and then cooled at the fin tube cooler 17 before entering the triplex filter unit 18, 19 and 110 (an example of a filter unit).

The triplex filter unit 18, 19 and 110 is configured to remove water and/or water vapour from the compressed atmospheric air. This type of filter may be termed an 'air dryer'.

As the compressed atmospheric air is passed through each filter 18, 19, and 110, filtered water, or condensed water vapour, is fed by gravity into drain valves 111.

The output from the triplex filter unit 18, 19, 110 is compressed atmospheric air with a reduced water, or water vapour, content. This compressed atmospheric air is then passed to the re-heat coil 113, where it is heated before entering the nitrogen membrane 115 (an example of a gas separator). The pressure control apparatus 30 receives this compressed atmospheric air at its fluid inlet 32a.

The nitrogen membrane 115 is configured to filter, or separate, out all constituent atmospheric gas components from the compressed atmospheric air except nitrogen. It should be appreciated that other types of gas separators of the gas generation apparatus/gas processing apparatus A' may be carbon molecular sieve filters, or mol sieve filters, catalytic reactors, hydrocarbon molecular sieves, or the like.

The nitrogen membrane filter 115 is connectable to a gas storage tank 117, which is configured to receive and store the filtered compressed nitrogen gas therein. However, it should be appreciated that gas storage tank is not essential, and instead the nitrogen gas may be supplied directly to the output 121a (an example of a separated gas outlet).

As illustrated in FIG. 3, the gas generation apparatus/gas processing apparatus A' comprises a number of other components that are used to operate the system. These components are well understood in the operation of gas generation apparatuses and no further explanation of their operation will be provided here. The gas generation apparatus/gas processing apparatus A' of FIG. 3 includes the following components:

11. Inlet filter
12. Compressor
13. Compressor offload valve
14. Silencer
15. Safety relief valve
16. Non-return valve
17. Fin tube cooler -continued 18. Water separator
19. Coarse particulate filter
110. Fine particulate filter
111. Drain valve
112. Pressure transducer
113. Re-heat coil
115. Nitrogen membrane
116. Hydrogen tower filter
117. Nitrogen storage tank
118. Fine particulate filter
119. Output pressure regulator
120. Output pressure gauge
121. Flow transducer
121a Output/Separated gas outlet
122. Manual ball valve Continued operation of the gas generation apparatus/gas processing apparatus A' results in a build-up of water in each drain valve 111. The drain valves 111 are periodically actuated to open and drain the water therefrom.

As the compressors 12 continue to operate the pressure of the compressed atmospheric air in the generator A', and the body portion 32 of the pressure control apparatus 30 rises. The pressure sensor module 34 measures the pressure of the gas and outputs its signal to the control module 38. Should the gas reach the pressure set point (i.e. a predetermined maximum pre-set pressure), the control module 38 operates the valve module 36 to reduce the gas pressure in the body portion 32 by venting the excess pressure out of the fluid outlet 32b.

As described above, the control module 32 proportionally controls the opening and closing of the valve 36a. That is, the amount that the valve 36 is opened may be proportional to the difference between the measured pressure and a predetermined pressure. The predetermined pressure may be a pressure set point of the pressure control apparatus 30.

Actuating the valve 36a in this manner maintains the gas pressure substantially at the predetermined set point, i.e., there is no significant drop in the pressure of the gas in the body portion 32, or the gas generation apparatus/gas processing apparatus A'. Maintaining the gas at this pressure therefore also maintains the flow rate of the compressed air through the gas generation apparatus/gas processing apparatus A' to the nitrogen membrane 115.

The pressure control apparatus 30 continues to operate in this manner during operation of the gas generation apparatus/gas processing apparatus A'. The pressure control apparatus 30 is therefore configured to operate automatically in dependence on the pressure signals received from the pressure sensor module 34 and control the gas pressure in the body portion 32, and gas generator apparatus/gas processing apparatus A'.

Reducing the pressure in the body portion 32 of the pressure control apparatus 30, and the gas generator apparatus/gas processing apparatus A' in the manner described above does not does significantly reduce the pressure in the gas generation apparatus/gas processing apparatus A'. This is because the control module 38 actuates the valve 36a of the valve module 36 with proportional control, which avoids any step change in pressure.

The operation of the valve 36a of the valve module 36 of the apparatus 30 is proportional to the pressure in the body portion 32. As described above, the amount that the valve 36a is opened may be proportional to the difference between the measured pressure and a predetermined pressure set point.

The pressure control apparatus 30 may operate from a 24 VDC and 0.5 A power supply. The operating temperature range may be between −10° C. to +85° C. The pressure control apparatus 30 can operate with water passing through the body portion 32, i.e., the apparatus 30 is "water rated". The accuracy of the pressure setting is 1%.

The predetermined pressure relief set points may be, for example, 80 psi and 140 psi. However, it should be appreciated that other pressure set points may be selected.

Providing a pressure control apparatus 30 in accordance with the present invention ensures that the gas produced by the gas generation apparatus/gas processing apparatus A' is consistently of a high purity. This is because the pressure control apparatus 30 allows the pressure in the gas generation apparatus/gas processing apparatus A' to effectively be maintained during the pressure relief operation of gas from the body portion 32 of the apparatus 30. This ensures that there is no significant pressure drop in the compressed air, or a reduction in flow rate, as it passes through the nitrogen membrane 115.

Furthermore, as the pressure control apparatus 30 uses an electronically-controlled valve 36a, there are no problems relating to the valve 36a not being able to close properly, which avoids the problems associated with pressure leaks in the gas generation apparatus/gas processing apparatus A'. This means that the compressors 12 are not running unnecessarily and are overworked, which decreases their operational lifespan. With the valve module 36 of the apparatus 30 of the present invention, problems with an effective pressure differential being created during opening and/or closing the valve are avoided, as there is no requirement for a slightly higher pressure than the pressure relief pressure being required to open the valve and a slightly lower pressure than the pressure relief pressure being required to close the valve, as with known pressure relief valves.

Also, as the setting of the predetermined pressure relief set point is set with the control module 38, the problems associated with the manually adjusting physical valve components to set the pressure relief point are avoided. This also avoids the problems associated with use of the apparatus 30 in different locations with different environmental conditions, as the pressure set points of the apparatus 30 can be set at the location of use.

Modifications and improvements may be made to the above without departing from the scope of the present invention.

For example, although the pressure control apparatus has been illustrated and described here in use with a gas generation apparatus/gas processing apparatus, the pressure control apparatus may be used in other systems, or arrangements. In other systems, or arrangements, it will be appreciated that the pressure control apparatus may operate to control the pressure in at least a portion of the system, or arrangement, by allowing the body portion and the pressure sensor module to be fluidly connected with the fluid in the system, such that the pressure sensor module may sense the fluid pressure and the control module may control the operation of the valve module. The pressure control apparatus of the present invention may therefore may function as a stand alone component that may be fitted, or retrofitted, to an existing system, or arrangement, where it is necessary to remove fluid, whilst reducing pressure drop therein.

Furthermore, although the gas generation apparatus/gas processing apparatus A' has been illustrated and described above as including a gas storage tank, it should be appreciated that this is not essential, and instead gas may be supplied directly to the output 121*a* (an example of a separated gas outlet/gas outlet).

Also, although the gas generation apparatus/gas processing apparatus A' has been illustrated and described above as including filter units 18, 19, 110 (an example of a filter unit) and a nitrogen membrane (an example of a gas separator), it should be appreciated that these filter units 18, 19, 110 and nitrogen membrane are not essential. In this arrangement, the apparatus may include a gas intake unit, a compressor unit, a gas outlet and a pressure control apparatus, and the pressure control apparatus controls the pressure in the apparatus downstream of the compressor unit. However, it should be appreciated that the gas generation apparatus/gas processing apparatus A' may include one or both or the filter units 18, 19, 110 (an example of a filter unit) and a nitrogen membrane (an example of a gas separator) components.

Although various embodiments of the method and system of the present invention have been illustrated in the accompanying Drawings and described in the foregoing Specification, it will be understood that the invention is not limited solely to the embodiments shown and disclosed, but is capable of numerous rearrangements, modifications, and substitutions without departing from the spirit and scope of the invention as set forth herein. It is intended that the Specification and examples be considered as illustrative only.

What is claimed is:
1. A gas generation apparatus comprising:
a gas intake unit;
a compressor unit, the compressor unit being operable to draw gas through the gas intake unit and into the compressor unit;
a gas separator, the gas separator being configured to separate the compressed gas from the compressor unit;
a separated gas outlet, the separated gas outlet being configured to receive the separated compressed gas from the gas separator; and
a pressure control apparatus, the pressure control apparatus being operable to control the pressure in the gas generation apparatus between the compressor unit and the gas separator, the pressure control apparatus comprising:
a body portion having a fluid inlet and a fluid outlet, wherein the fluid outlet allows the fluid to vent to atmosphere;
a pressure sensor module, the pressure sensor module being configured to measure the pressure of fluid in the body portion;
a valve module, the valve module being operable to control the flow of fluid out of the fluid outlet of the body portion, wherein the valve module includes a valve, the valve module being operable to control the amount that the valve is open between a fully closed position and a fully open position; and
a control module, the control module being configured to receive an output signal from the pressure sensor module, and operate the valve module,
wherein the control module is configured to actuate the valve, and
wherein the control module uses a variable pulse, or pulse width modulation (PWM) to operate the opening and closing of the valve.
2. The gas generation apparatus of claim 1, wherein the pressure sensor module generates an output signal which is indicative of the measured pressure.
3. The gas generation apparatus of claim 2, wherein the signal generated by the pressure sensor module varies as a function of the measured pressure.
4. The gas generation apparatus of claim 2, wherein the pressure sensor module is at least one of configured to continuously output a signal to the control module and configured to periodically output a signal to the control module.
5. The gas generation apparatus of claim 1, wherein the valve module is configured to allow proportional fluid flow from the body portion through the valve module to the atmosphere.
6. The gas generation apparatus of claim 1, wherein the valve is an electronically-controlled valve, or an electro-mechanical valve.
7. The gas generation apparatus of claim 1, wherein the control module is configured to modulate the opening and closing of the valve.
8. The gas generation apparatus of claim 6, wherein the control module is configured to open and/or close the valve by an amount that is proportional to the difference between the measured pressure and a predetermined pressure.
9. The gas generation apparatus of claim 1, wherein the control module is configured to operate the valve module once a predetermined pressure has been reached in the body portion of the apparatus.
10. The gas generation apparatus of claim 1, wherein the control module includes a micro controller (MC), the MC including a power supply module, an input/output (I/O) module, a processor module, and a programming module.
11. The gas generation apparatus of claim 10, wherein the control module includes one or more programmable memory devices, one or more memory storage devices, or one or more computing devices, the control module being operable to run or more computer programs.
12. The gas generation apparatus of claim 1, wherein the control module is at least one of configured to selectively receive output signals from the pressure sensor module and configured to continuously receive output signals from the pressure sensor module.
13. The gas generation apparatus of claim 1, wherein the control module is configured to set the pressure at which the pressure sensor module outputs a signal to the control module.
14. The gas generation apparatus of claim 13, wherein the control module is configured to select one or more pressure set points at which the pressure sensor module outputs a signal to the control module.
15. The gas generation apparatus of claim 14, wherein the control module includes a manual switch, the manual switch selecting the pressure set point at which the control module operates the valve module to reduce the pressure of fluid in the body portion.
16. A method of generating gas comprising the steps of:
providing a gas generation apparatus comprising:
a gas intake unit;
a compressor unit, the compressor unit being operable to draw gas through the gas intake unit and into the compressor unit;
a gas separator, the gas separator being configured to separate the compressed gas from the compressor unit;
a separated gas outlet, the separated gas outlet being configured to receive the separated compressed gas from the gas separator; and
a pressure control apparatus, the pressure control apparatus being operable to control the pressure in the gas generation apparatus between the compressor unit and the gas separator, the pressure control apparatus comprising:
- a body portion having a fluid inlet and a fluid outlet, wherein the fluid outlet allows the fluid to vent to atmosphere;
- a pressure sensor module, the pressure sensor module being configured to measure the pressure of fluid in the body portion;
- a valve module, the valve module being operable to control the flow of fluid out of the fluid outlet of the body portion, wherein the valve module includes a valve, the valve module being operable to control the amount that the valve is open between a fully closed position and a fully open position; and
- a control module, the control module being configured to receive an output signal from the pressure sensor module, and operate the valve module,
  - wherein the control module is configured to actuate the valve, and
  - wherein the control module uses a variable pulse, or pulse width modulation (PWM) to operate the opening and closing of the valve;

operating the compressor unit to draw gas through the gas intake unit into the compressor unit;

separating the compressed gas from the compressor unit with the gas separator;

providing the separated gas to the separated gas outlet; and operating the pressure control apparatus to control the pressure in the gas generation apparatus between the compressor unit and the gas separator.

17. A gas processing apparatus comprising:
- a gas intake unit;
- a compressor unit, the compressor unit being operable to draw gas through the gas intake unit and into the compressor unit;
- a gas outlet, the gas outlet being configured to receive compressed gas from the compressor unit; and
- a pressure control apparatus, the pressure control apparatus being operable to control the pressure in the gas processing apparatus downstream of the compressor unit, the pressure control apparatus comprising:
  - a body portion having a fluid inlet and a fluid outlet, wherein the fluid outlet allows the fluid to vent to atmosphere;
  - a pressure sensor module, the pressure sensor module being configured to measure the pressure of fluid in the body portion;
  - a valve module, the valve module being operable to control the flow or fluid out of the fluid outlet of the body portion, wherein the valve module includes a valve, the valve module being operable to control the amount that the valve is open between a fully closed position and a fully open position; and
  - a control module, the control module being configured to receive an output signal from the pressure sensor module, and operate the valve module,
  - wherein the control module is configured to actuate the valve, and
  - wherein the control module uses a variable pulse, or pulse width modulation (PWM) to operate the opening and closing of the valve.

* * * * *